United States Patent
Chiodini et al.

(10) Patent No.: US 9,829,562 B2
(45) Date of Patent: Nov. 28, 2017

(54) METHOD FOR GEOPOSITIONING MOBILE UNITS MOVING AROUND INSIDE A CLOSED STRUCTURE

(71) Applicant: SAFRAN ELECTRONICS & DEFENSE, Boulogne Billancourt (FR)

(72) Inventors: Alain Chiodini, Boulogne Billancourt (FR); Patrick Sechaud, Boulogne Billancourt (FR)

(73) Assignee: Safran Electronics & Defense, Boulogne Billancourt (FR)

( * ) Notice: Subject to any disclaimer, the term of this patent is extended or adjusted under 35 U.S.C. 154(b) by 0 days.

(21) Appl. No.: 15/519,469

(22) PCT Filed: Oct. 15, 2015

(86) PCT No.: PCT/EP2015/073951
§ 371 (c)(1),
(2) Date: Apr. 14, 2017

(87) PCT Pub. No.: WO2016/059189
PCT Pub. Date: Apr. 21, 2016

(65) Prior Publication Data
US 2017/0242094 A1    Aug. 24, 2017

(30) Foreign Application Priority Data
Oct. 17, 2014    (FR) ..................... 14 60042

(51) Int. Cl.
*H04W 24/00*    (2009.01)
*G01S 5/02*    (2010.01)
(Continued)

(52) U.S. Cl.
CPC ............ *G01S 5/0289* (2013.01); *G01S 19/13* (2013.01); *H04W 4/04* (2013.01)

(58) Field of Classification Search
CPC ......... G01S 5/0289; G01S 19/13; H04W 4/04
(Continued)

(56) References Cited

U.S. PATENT DOCUMENTS 7,091,851 B2 *    8/2006    Mason .................. G01S 5/0027
                                                           340/539.11
8,214,147 B2 *    7/2012    Cheok .................. G01S 5/0284
                                                                701/470

(Continued)

OTHER PUBLICATIONS

I. Bekmezci et al., "Periodic Global Broadcast Time Synchronization (PGB-TS) for TDMA Based Sensor Networks", 3rd International Conference on Recent Advances in Space Technologies, 2007. RAST '07. IEEE, PI, Jun. 1, 2007 (Jun. 1, 2007), pp. 531-536.

*Primary Examiner* — Marceau Milord
(74) *Attorney, Agent, or Firm* — Muncy, Geissler, Olds & Lowe, P.C.

(57) ABSTRACT

A method of positioning a group of subordinate communications units relative to a coordinating communications unit, the method comprising the following steps: the coordinating unit transmitting a specific identification table to each subordinate unit; each unit transmitting its UWB signature; each unit analyzing the received UWB signatures and determining the distances between that unit and each of the other units; each subordinate unit transmitting to the coordinating unit the distances between that subordinate unit and each of the other units; and the coordinating unit determining the relative positions of the subordinate units.

12 Claims, 6 Drawing Sheets

(51) Int. Cl.
*G01S 19/13* (2010.01)
*H04W 4/04* (2009.01)

(58) Field of Classification Search
USPC ........ 455/456.1, 457, 404.2, 12.1, 13.1, 427
See application file for complete search history.

(56) References Cited

U.S. PATENT DOCUMENTS

| | | | |
|---|---|---|---|
| 9,019,101 B2* | 4/2015 | Tian | G01S 5/02 |
| | | | 340/539.1 |
| 2004/0006424 A1* | 1/2004 | Joyce | G01S 5/0027 |
| | | | 701/408 |
| 2004/0033808 A1 | 2/2004 | Rorabaugh | |
| 2004/0192353 A1 | 9/2004 | Mason et al. | |
| 2007/0194987 A1 | 8/2007 | Fedora | |
| 2008/0234930 A1 | 9/2008 | Cheok et al. | |
| 2009/0027272 A1 | 1/2009 | Don Carlos | |
| 2009/0201208 A1 | 8/2009 | McPherson et al. | |
| 2010/0074133 A1 | 3/2010 | Kim et al. | |
| 2014/0152437 A1 | 6/2014 | Tian et al. | |
| 2014/0256353 A1 | 9/2014 | Denis et al. | |
| 2015/0319046 A1* | 11/2015 | Plummer | H04L 12/2807 |
| | | | 715/736 |
| 2016/0259032 A1* | 9/2016 | Hehn | G01S 5/0289 |

\* cited by examiner

METHOD FOR GEOPOSITIONING MOBILE UNITS MOVING AROUND INSIDE A CLOSED STRUCTURE

FIELD OF THE INVENTION

The present invention relates to the field of locating and more particularly locating movable communications units when they are deployed away from base, such as for example the deployment of emergency crews, operational units, construction workers, or hikers.

BACKGROUND OF THE INVENTION

A conventional locating system makes use of satellite geo-locating receivers of the global positioning system (GPS) type or the like (GLONAS, Galileo, . . . ) fitted to the communications units of members of a group. Such GPS receivers serve to locate each member of the group in a terrestrial reference frame using their latitude, longitude, and altitude. The communications units can transmit their positions by radio, and can thus inform a coordinator of their respective positions. That system nevertheless presents the drawbacks associated with GPS technology. Specifically, it can be made inoperative or inaccurate as a result of environmental factors such as thunderstorms, high levels of humidity, or radio interference. GPS receivers can also be inoperative in covered sites such as in buildings or in underground installations. Since the deployment time for obtaining a location by GPS is associated with the time the GPS receiver requires in order to receive signals coming from satellites in sufficient number to enable the receiver to determine its position, several minutes may elapse before a unit can be positioned. Finally, the degraded accuracy of GPS for non-military uses can be found to be unsuitable for certain actions that require precise locating within a building, such as actions by emergency crews during a fire.

OBJECT OF THE INVENTION

An object of the invention is to provide a method of relative positioning for communications units that can be deployed quickly and independently of the quality or the existence of coverage of the zone in which the units are situated by a satellite geo-locating system.

SUMMARY OF THE INVENTION

To this end, the invention provides a method of positioning a group of subordinate communications units relative to a coordinating communications unit, the group comprising at least first, second, third, and fourth subordinate communications units, the coordinating communications unit and the subordinate communications units being movable relative to one another, each communications unit having a UWB transceiver and digital wireless communications means for communicating with the coordinating unit, each subordinate unit including an internal clock synchronized with the clock of the coordinating unit in order to define a shared communications period, the method comprising the following steps:

during a preparatory stage, the coordinating unit transmitting to each subordinate unit via the wireless digital communications means a specific identification table comprising an identifier, a UWB signature, and a transmission delay duration, and communicating, via the wireless digital communications means, identification tables for each unit to the other subordinate units; and during an operative stage:
each unit transmitting its UWB signature, this transmission taking place after the transmission delay duration has elapsed as measured from the beginning of the communications period;
each unit analyzing the UWB signatures transmitted by the other units and determining the distances separating that unit from each of the other units;
each subordinate unit transmitting to the coordinating unit the distances between that subordinate unit and each of the other units, this transmission taking place by using the wireless digital communications means; and
the coordinating unit determining the relative positions of the subordinate units.

This method makes it possible to determine the positions of communications units that are movable relative to one another without having recourse to fixed beacon installations or to the availability of satellite coverage, thus enabling communications units to be deployed quickly on unknown terrain, while using equipment that is lightweight and portable.

The invention also provides a positioning device comprising data processor means and storage means, an internal clock, a UWB transceiver, and wireless digital communications means, the device being arranged to perform the method of the invention.

Other characteristics and advantages of the invention appear on reading the following description of particular, nonlimiting embodiments of the invention.

BRIEF DESCRIPTION OF THE DRAWINGS

Reference is made to the accompanying drawings, in which.

DETAILED DESCRIPTION OF THE INVENTION

Figure 1:
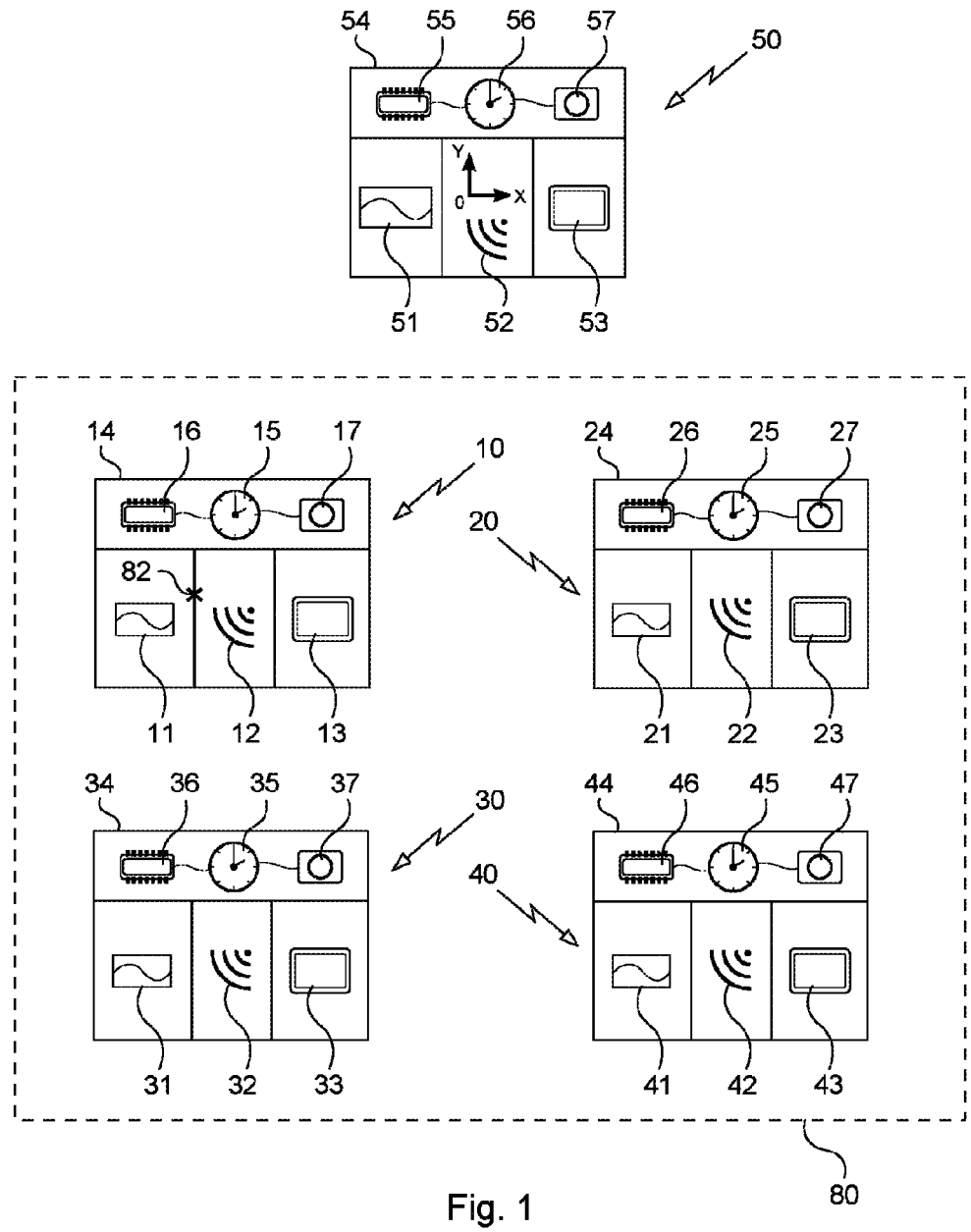
FIG. 1 is a diagrammatic view of communications units of the invention.

With reference to FIG. 1, the positioning method of the invention is described in application to relative positioning of a group of four subordinate communications units comprising a first unit 10, a second unit 20, a third unit 30, and a fourth unit 40, relative to a coordinating communications unit 50.

The unit 50 comprises an ultra-wideband (UWB) transceiver 51, a digital enhanced cordless telephone (DECT)

type transceiver 52, and a GPS receiver 53, all of which are connected to a data processor unit 54 having a microcontroller 55 with its operation clocked by an internal clock 56, and having a memory 57. In the meaning of the present application, a UWB signal occupies a bandwidth of at least 500 MHz.

The first unit 10 has a first UWB transceiver 11, a DECT type transceiver 12, a GPS receiver 13, and a data processor unit 14 having an internal clock 15, a microcontroller 16, and a memory 17.

Each of the second, third, and fourth units 20, 30, and 40 comprises a UWB transceiver 21 (or respectively 31, 41), a DECT transceiver 22 (or respectively 32, 42), a GPS receiver 23 (or respectively 33, 43), and a data processor unit 24 (or respectively 34 and 44) having an internal clock 25 (or respectively 35, 45), a microcontroller 26 (or respectively 36, 46), and a memory (or respectively 37, 47).

The processor unit 14 of the unit 10 has four predictive filters of the "Kalman" filter type 18.20, 18.30, 18.40, and 18.50 dedicated to estimating and to smoothing the respective distances D10-20, D10-30, D10-40, and D10-50 between the unit 10 and the units 20, 30, 40, and 50. The acquisition of these measurements is described in detail below. The use of such predictive filters enables the unit 10 at all times to produce and optimize estimates of the distances taking account in particular of the moment at which each of the distances D10-20, D10-30, D10-40, and D10-50 was measured.

The processor units 24, 34, 44, and 54 are likewise provided with respective filters for estimating and smoothing the distances separating the units 20, 30, 40, and 50 from the other units 10, 20, 30, 40, and 50.

The units 10, 20, 30, 40, and 50 have independent power supplies, and consequently they are mobile.

Figure 2:
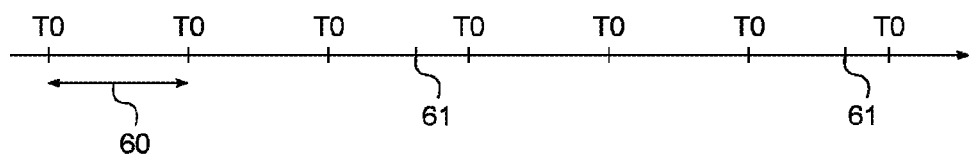
FIG. 2 is a diagrammatic view of the time division of communications between the communications units of FIG. 1.
Figure 3:
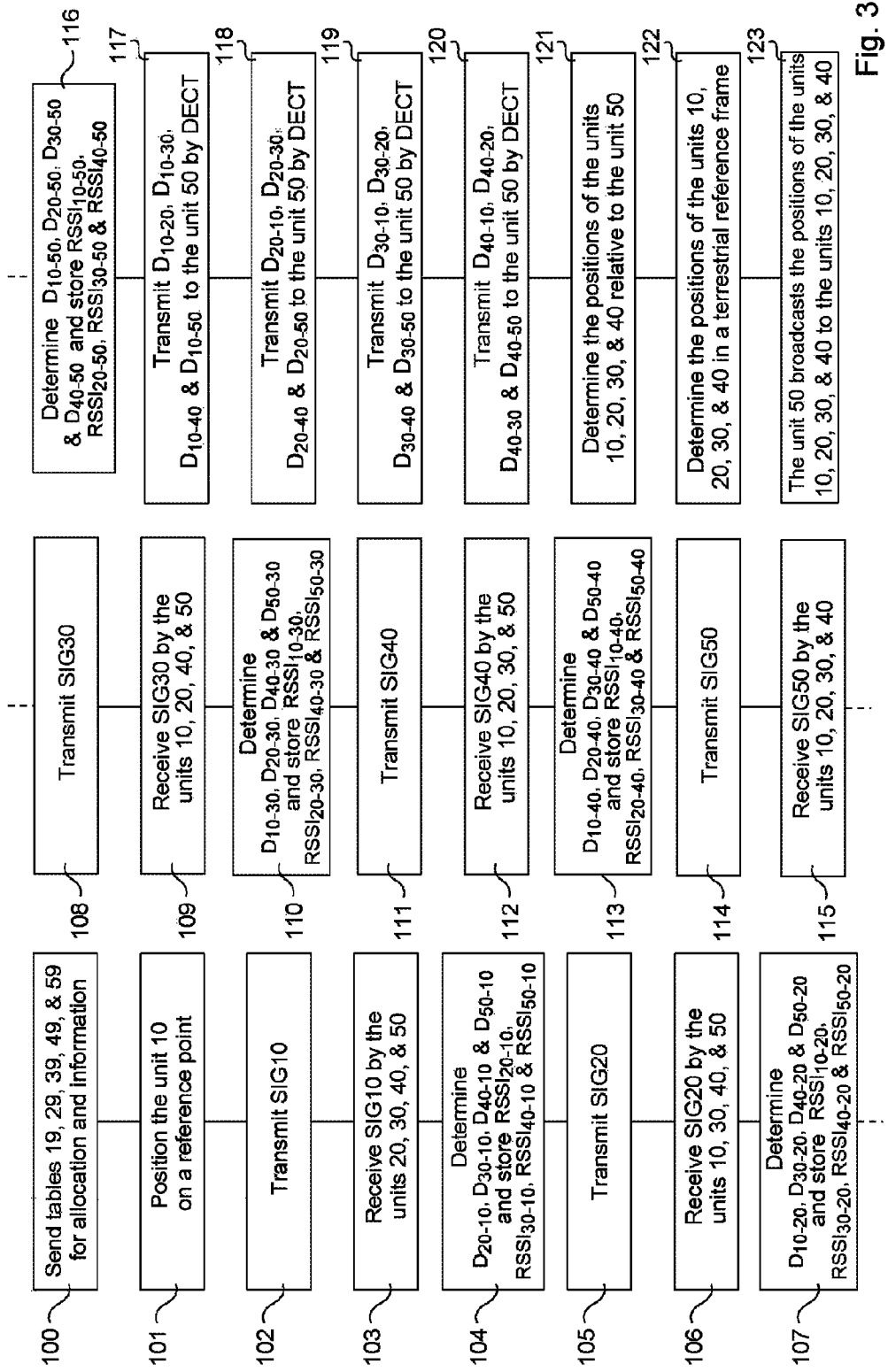
FIG. 3 is a flowchart showing the steps of a first implementation of the positioning method of the invention.
Figure 4:
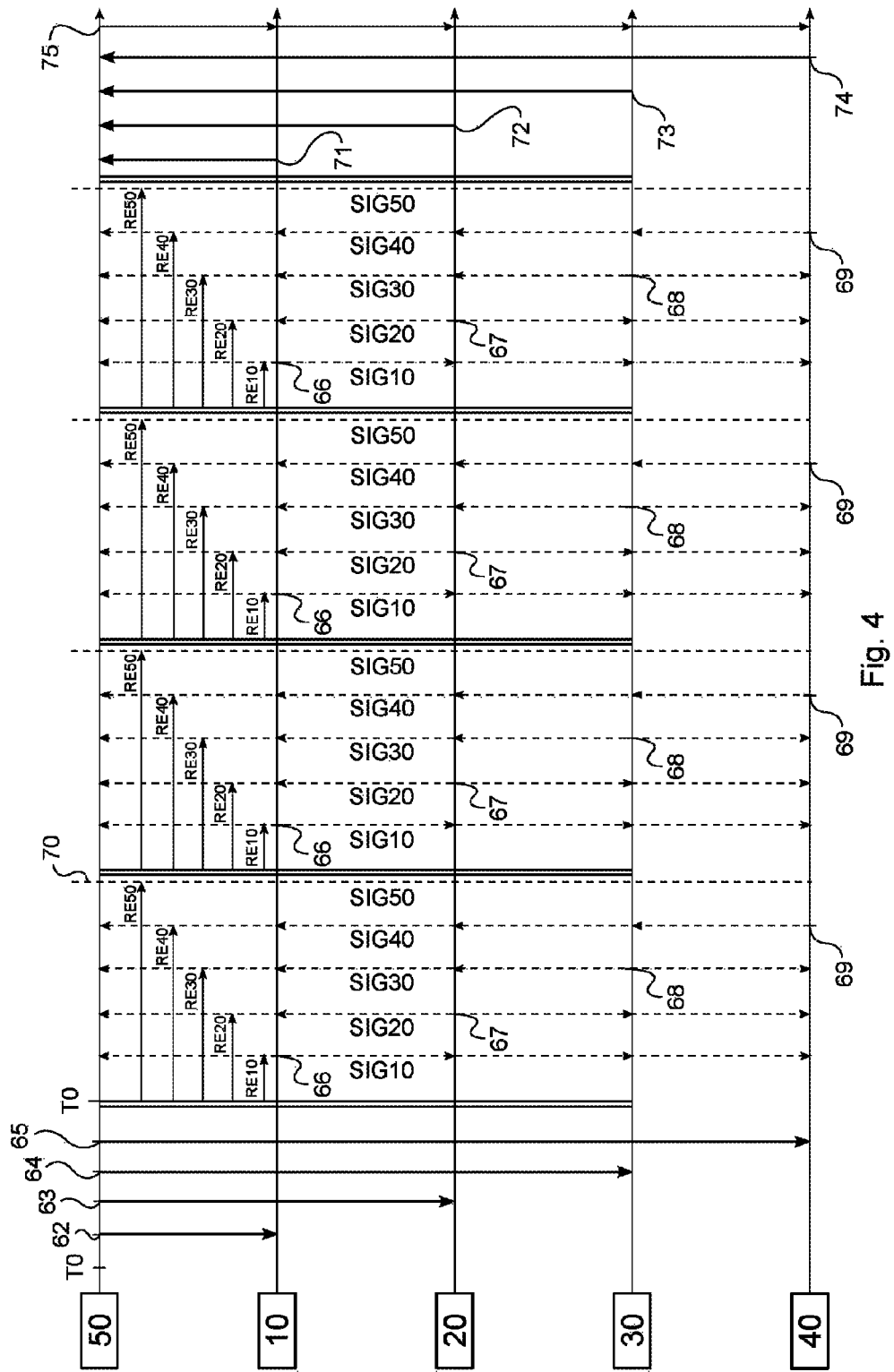
FIG. 4 is a diagrammatic view of exchanges between the communications units of FIG. 1.
Figure 5:
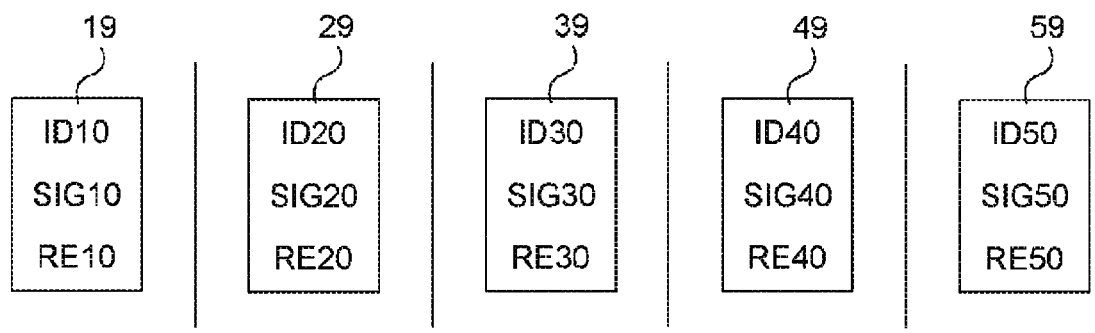
FIG. 5 is a diagrammatic view of identification tables of the FIG. 1 communications units.

Communication between the units 10, 20, 30, 40, and 50 takes place using the DECT transceivers 12, 22, 32, 42, and 52 in application of a mode of multiplexing known as time division multiple access (TDMA) over a shared communication period known as a frame 60 that repeats cyclically and of duration that is constant and known to each of the communications units (FIG. 2). Each unit 10, 20, 30, 40, and 50 has a common time reference T0 corresponding to the beginning of a frame 60. This time reference T0 is kept synchronized among the units by the unit 50 cyclically transmitting a DECT synchronization signal 61. The units 10, 20, 30, and 40 synchronize their respective internal clocks 15, 25, 35, and 45 on this synchronization signal 61. As for the unit 50, it synchronizes its own internal clock 56 on the internal clock of the GPS satellite system from which it receives signals. In order to synchronize their respective internal clocks 15, 25, 35, and 45, the units 10, 20, 30, and 40 also make use of the reference signal coming from their respective GPS receivers 13, 23, 33, and 43 whenever they are capable of picking up a GPS signal. Where appropriate, the synchronization signal 61 enables synchronization of the units 10, 20, 30, 40, and 50 to be readjusted among one another.

In a first implementation of the invention, and with reference to FIGS. 1 to 6, the subordinate units 10, 20, 30, and 40 are located inside a closed structure, specifically a building 80, while the unit 50 is situated outside the building 80.

Figure 6:
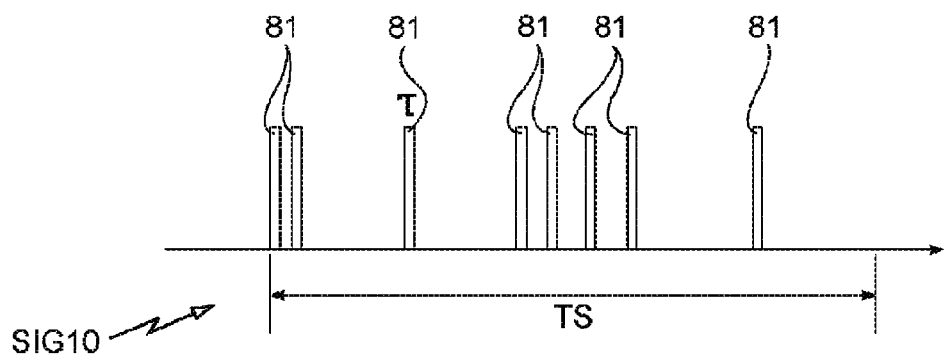
FIG. 6 is a diagram showing the UWB signature of one of the FIG. 1 communications units.

During a preparatory stage 100, the coordinating unit 50 sends a DECT signal 62 (represented by a continuous line arrow) for the attention of the first unit 10 and conveying an identification table 19 specific to the unit 10 for allocation thereto. This identification table 19 contains the following elements: an identifier ID10, a UWB signature SIG10, and a transmit delay duration RE10. In this example, the identifier ID10 corresponds to an integer. The UWB signature ID10 is shown in FIG. 6 and is constituted by a train of non-periodic pulses of duration Ts made up of eight ultrashort pulses 81 of unit duration τ, equal to 0.5 nanoseconds (ns) in this example. The transmission delay duration RE10 corresponds to the duration, in this example equal to 1 milliseconds (ms), between the common time reference T0 marking the beginning of the frame 60 and the beginning of transmission by the unit 10 of the UWB signature SIG10. For information purposes, the DECT signal 62 also comprises the identification tables 29, 39, 49, and 59 of the units 20, 30, 40, and 50. These identification tables 29, 39, 49, and 59 comprise the identifiers ID20, ID30, ID40, and ID50, the UWB signatures SIG20, SIG30, SIG40, and SIG50, and also the transmission delay durations RE20, RE30, RE40, and RE50 respectively of the units 20, 30, 40, and 50. In this example, the values of the transmission delay durations RE20, RE30, RE40, and RE50 are respectively two, three, four, and five milliseconds. A DECT signal 63 is then transmitted by the coordinating communications unit 50 for the attention of the communications unit 20, and it comprises the identification table 29 for allocation thereto, together with the identification tables 19, 39, 49, and 59, for information purposes. After the DECT signal 63, a DECT signal 64 is transmitted by the coordinating communications unit 50 for the attention of the communications unit 30, and it comprises the identification table 39 for allocation thereto, together with the identification tables 19, 29, 49, and 59, for information purposes. After the DECT signal 64, a DECT signal 65 is transmitted by the coordinating communications unit 50 for the attention of the communications unit 40, and it comprises the identification table 49 for allocation thereto, together with the identification tables 19, 29, 39, and 59, for information purposes.

Each unit 10, 20, 30, 40, and 50 then has means for identifying the UWB signatures of the other units. The transmission delay durations RE10, RE20, RE30, RE40, and RE50 make it possible to avoid "collisions" between the transmissions of the UWB signatures SIG10, SIG20, SIG30, SIG40, and SIG50 by the units 10, 20, 30, 40, and 50. A "collision" between transmissions corresponds to a situation in which two units transmit their signatures during overlapping periods, thereby having the effect of preventing both of those units from receiving the signal from the other, and possibly also disturbing the reception of signals by the other units.

During a prior step 101 of determining the relative position of the first unit 10 relative to the unit 50, the unit 10 is positioned at a reference point 82 of the building 80. The unit 50 knows the exact position of the reference point 82 from its GPS coordinates. By way of example, the unit 10 may be accurately positioned on the reference point 82 by using a plan of the building 80.

The method of the invention for positioning relative to the unit 50 then enters an operative stage having a step 102 in which the unit 10 transmits its UWB signature SIG10 using its UWB transceiver 11. The signature SIG10 is drawn in discontinuous lines in FIG. 4. This transmission, referenced 66, takes place after the transmission delay duration RE10 has elapsed, as measured from the common time reference T0 marking the beginning of the frame 60.

The UWB signature SIG10 is received by the respective UWB transceivers 21, 31, 41, and 51 of the units 20, 30, 40, and 50 (step 103) that analyze the signals and then determine the distance D20-10 between the unit 20 and the unit 10, and also the distances D30-10, D40-10, and D50-10 lying respectively between the units 30, 40, and 50 and the unit 10 (step 104). Reception of the signal SIG10 by the units 20, 30, 40, and 50 is also accompanied by each of the receiver units 20, 30, 40, and 50 measuring and recording respective received signal powers, known as received signal strength indications (RSSIs). The power measurements RSSI20-10, RSSI30-10, RSSI40-10, and RSSI50-10 corresponding to the measured powers with which the UWB signal SIG10 is received respectively by each of the units 20, 30, 40, and 50 are stored in each receiver unit. Methods for determining distances by using UWB signals are known to the person skilled in the art. In this example, this is done by measuring the propagation time of the UWB signal.

During step 105, the unit 20 transmits its UWB signature SIG20 using the UWB transceiver 21. This transmission, referenced 67, takes place after the transmission delay duration RE20 has elapsed, as measured from T0. The UWB signature SIG20 is received by the respective transceivers 11, 31, 41, and 51 of the units 10, 30, 40, and 50 (step 106). These units then determine the distances D10-20, D30-20, D40-20, and D50-20 lying respectively between the units 10, 30, 40, and 50 and the unit 20 (step 107). The units 10, 30, 40, and 50 measure and store the respective powers RSSI10-20, RSSI30-20, RSSI40-20, and RSSI50-20 with which they receive the signal 67.

Steps 108 to 116 consist in repeating steps 102 to 107 as applied to transmitting the UWB signatures SIG30, SIG40, and SIG50 in the form of signals referenced 68, 69, and 70 by the communications units 30, 40, and 50, and determining the following distances: D10-30, D20-30, D40-30, D50-30, D10-40, D20-40, D30-40, D50-40, D10-50, D20-50, D30-50, and D40-50. In identical manner, the communications units store the received powers associated with each distance measurement.

The distances D10-20, D10-30, D10-40, and D10-50 are stored in the memory 17 of the unit 10. In similar manner, the distances between each unit and the other units are stored in their respective memories 27, 37, 47, and 57. Steps 102 to 116 are then repeated (four times in this example) and the units 10, 20, 30, 40, and 50 use the new distance determinations as inputs for the dedicated predictive filters of the processor units 14, 24, 34, 44, and 54, in order to refine the estimates of the distances between them and the other units. These estimates are then transmitted to the unit 50 by means of DECT signals. The unit 10 transmits the distances D10-20, D10-30, D10-40, and D10-50 to the unit 50 using a DECT signal 71 (step 117) after the transmission delay duration RE10 has elapsed as measured from the common time reference T0. In similar manner, the units 20, 30, and 50 transmit their distance estimates to the unit 50 by using respective DECT signals 72, 73, and 74 (steps 118 to 120).

On the basis of this information, the coordinating unit 50 uses a method analogous to triangulation to crosscheck the distances in order to determine the positions of the units 10, 20, 30, and 40 relative to the unit 50. By way of example, this determination may be done as follows.

A plane rectangular coordinate system (O, x, y) is associated with the unit 50. In this coordinate system, the coordinates of the unit 10 are (X10, Y10), the coordinates of the unit 20 are (X20, Y20), the coordinates of the unit 30 are (X30, Y30), the coordinates of the unit 40 are (X40, Y40), and the coordinates of the unit 50 are (X50, Y50). Thus, the following system of equations is obtained:

$$D10\text{-}20=((X20-X10)^2+(Y20-Y10)^2)^{(1/2)};$$

$$D10\text{-}30=((X30-X10)^2+(Y30-Y10)^2)^{(1/2)};$$

$$D10\text{-}40=((X40-X10)^2+(Y40-Y10)^2)^{(1/2)};$$

$$D10\text{-}50=((X50-X10)^2+(Y50-Y10)^2)^{(1/2)};$$

$$D20\text{-}30=((X20-X30)^2+(Y20-Y30)^2)^{(1/2)};$$

$$D20\text{-}40=((X20-X40)^2+(Y20-Y40)^2)^{(1/2)};$$

$$D20\text{-}50=((X20-X50)^2+(Y20-Y50)^2)^{(1/2)};$$

$$D30\text{-}40=((X30-X40)^2+(Y30-Y40)^2)^{(1/2)};$$

$$D30\text{-}50=((X30-X50)^2+(Y30-Y50)^2)^{(1/2)};$$

$$D40\text{-}50=((X40-X50)^2+(Y40-Y50)^2)^{(1/2)}.$$

The distances between two units are obtained by filtering and combining the measurements taken by each of the units concerned. For example, the distance D10-20 is determined by taking the average of the distance D10-20 as measured by the unit 10 and the distance D20-10 as measured by the unit 20.

In the situation in which the position of the unit relative to the unit 50 is known, and in which the units are all assumed to be in the same horizontal plane, the coordinating unit 50 can determine the positions of the units 20, 30, and 40 relative to its own position (step 121) by solving the above system of equations, which then has ten equations in six unknowns. Methods of solving such a system, in particular by substitution, are known to the person skilled in the art.

The positions of the units 10, 20, 30, and 40 relative to the unit 50 are thus known by their coordinates in the plane rectangular coordinate system (O, x, y) associated with the unit 50. Since the unit 50 has a GPS receiver 53, it determines its own GPS coordinates in a terrestrial reference frame and proceeds to determine the positions of the units 20, 30, and 40 in the same terrestrial reference frame by changing reference frame, e.g. using a transition matrix (step 122). Thus, the positions of the units 10, 20, 30, and 40 in a terrestrial reference frame can then be determined, even though the GPS receivers of these units are not in a position to receive usable GPS signals.

The positions of the units 10, 20, 30, 40, and 50 are then broadcast by a DECT signal 75 transmitted by the unit 50 to all of the other units (step 123).

In a second implementation, each of the units 10, 20, 30, 40, and 50 includes an altimeter, and the units 10, 20, 30, and 40 also use DECT transceivers 12, 22, 32, and 42 to transmit their measured altitudes to the unit 50. The unit 50 can then determine the relative heights of the units 10, 20, 30, and 40, in addition to their relative positions in a plane. This produces a method of positioning the units 10, 20, 30, and 40 three-dimensionally relative to the unit 50.

There follows a description of a third implementation of the invention in which only the prior step of determining the position of the first unit 10 relative to the unit 50 is different. In this step 141 of determining the position of the first unit 10 relative to the unit 50, the unit 10 located inside the building 80 remains stationary, and it is the unit 50 that moves while taking regular measurements of the distances D50-10 and D10-50 between the unit 10 and the unit 50. These measurements are taken by the units 10 and 50 transmitting and receiving signatures SIG10 and SIG50. For each position of the unit 50, the data processor unit stores the GPS coordinates of the unit 50 in the terrestrial reference frame together with the associated distances D10-50 and D50-10. The data processor unit 54 can then use triangulation to determine the position of the unit 10 in the terrestrial reference frame. Steps 100 and 102 to 122 of the method remain unchanged.

Steps that are identical or similar to those of the above-described method are given identical numerical references in the description below of a fourth implementation of the invention.

This fourth implementation applies in particular to situations in which the coordinates of the unit 10 cannot be determined during the prior stage (step 101 or 141).

The respective processor units 14, 24, 34, and 44 of the subordinate units 10, 20, 30, and 40 are arranged to store in memory their most recently measured GPS positions. Thus, during an interruption of the GPS connection, each unit 10, 20, 30, and 40 has in its memory its initial position and speed (in the form of a vector), i.e. its position and speed prior to putting into operation the method of the invention (step prior to step 100). The initial positions of the units 10, 20, 30, and 40 have the following respective coordinates (X10init, Y10init, Z10init), (X20init, Y20init, Z20init), (X30init, Y30init, Z30init), and (X40init, Y40init, Z40init). The initial speeds of the units 10, 20, 30, and 40 are respectively written V10init, V20init, V30init, and V40init.

Figure 7:
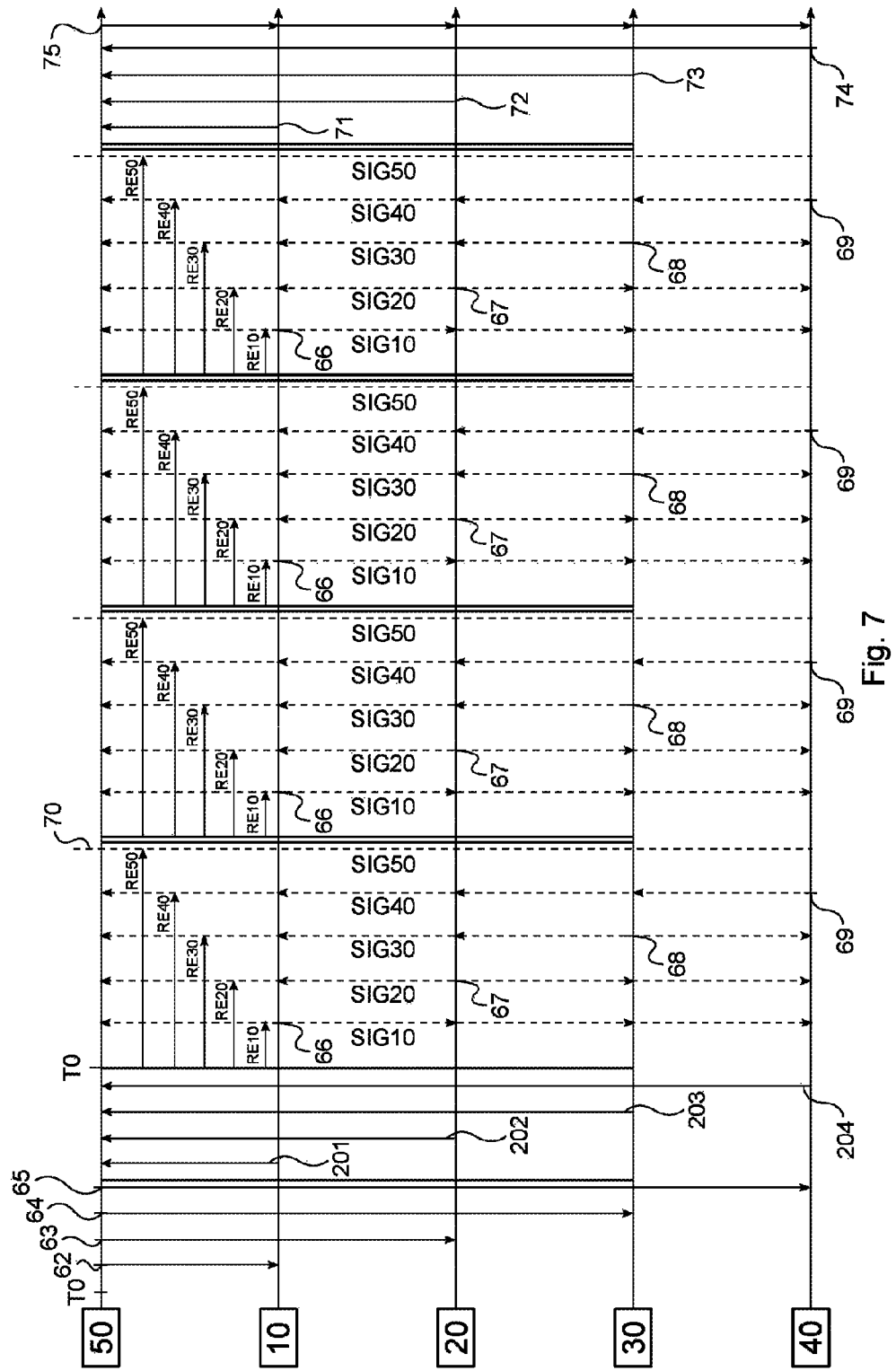
FIG. 7 is a diagrammatic view of exchanges between the communications units in a particular implementation.
Figure 8:
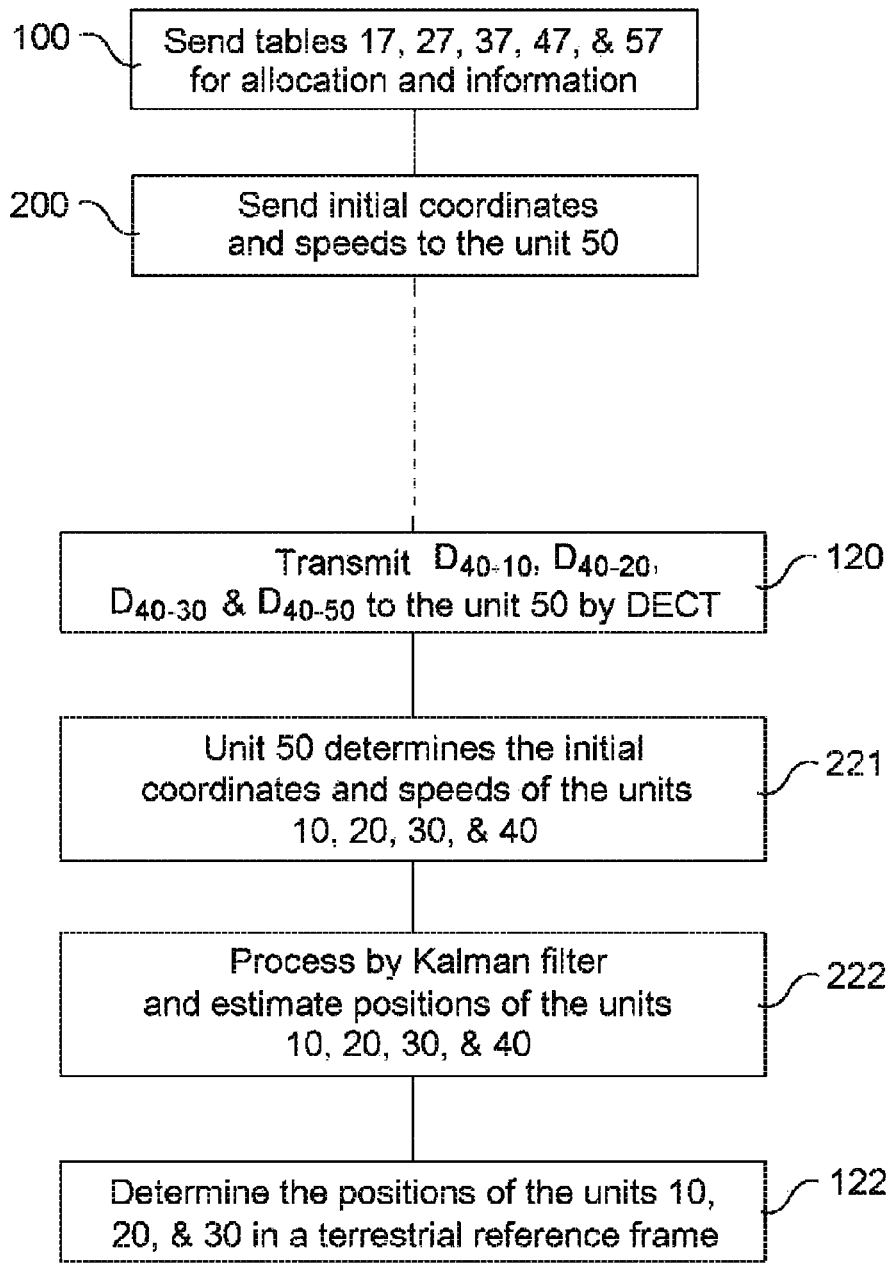
FIG. 8 is a flowchart showing the steps of a particular implementation of the positioning method of the invention.

With reference to FIGS. 7 and 8, after the step 100 of the unit 50 sending tables, each unit 10, 20, 30, and 40 transmits its respective initial coordinates and speed to the unit 50 via respective DECT signals 201, 202, 203, and 204 (step 200). The positioning method continues in application of steps 102 to 120.

The initial coordinates of the units 10, 20, 30, 40, and 50 are used by the processor unit 54 to calculate the initial distances D10-20init, D10-30init, D10-40init, D10-50init, D20-30init, D20-40init, D20-50init, D30-40init, and D40-50init.

The step 221 of determining the coordinates of the units 10, 20, 30, and 40 is performed by minimizing the following cost function $C_1$:

$$C_1(x_k, y_k, z_k) = \sum_{n \neq k} w_n \left( \sqrt{(x_k - x_n)^2 + (y_k - y_n)^2 + (z_k - z_n)^2} - d_n \right)^2$$

in which:

$x_k$, $y_k$, and $z_k$ are the coordinates of the unit k of position that is to be determined in the coordinate system (O, X, Y, Z) associated with the unit 50;

$d_n$ is the distance between the unit k and the unit n;

$x_n$, $y_n$, and $z_n$ are the coordinates of the unit n at the distance $d_k$ from the unit k; and $w_n$ is a weighting coefficient associated with the measured reception power of the signal coming from the node of index n. $w_n$ is thus a function of $RSSI_k(n)$.

For the first determination, the initial values of the variables $x_k$, $y_k$, $z_k$ and the distances $d_n$ corresponded to the initial coordinates of the units and to their initial distances.

The extremum of the function $C_1$ corresponds to the looked-for position and is obtained by solving the following system of equations:

$$\begin{cases} \frac{\partial C_1}{\partial x_k}(x_k, y_k, z_k) = 0 \\ \frac{\partial C_1}{\partial y_k}(x_k, y_k, z_k) = 0 \\ \frac{\partial C_1}{\partial z_k}(x_k, y_k, z_k) = 0 \end{cases}$$

I.e.:

$$\begin{cases} \frac{\partial C_1}{\partial x_k}(x_k, y_k, z_k) = \\ \sum_{n \neq k} w_n(x_k - x_n)\left(1 - \frac{d_n}{\sqrt{(x_k - x_n)^2 + (y_k - y_n)^2 + (z_k - z_n)^2}}\right) = 0 \\ \frac{\partial C_1}{\partial y_k}(x_k, y_k, z_k) = \\ \sum_{n \neq k} w_n(y_k - y_n)\left(1 - \frac{d_n}{\sqrt{(x_k - x_n)^2 + (y_k - y_n)^2 + (z_k - z_n)^2}}\right) = 0 \\ \frac{\partial C_1}{\partial z_k}(x_k, y_k, z_k) = \\ \sum_{n \neq k} w_n(z_k - z_n)\left(1 - \frac{d_n}{\sqrt{(x_k - x_n)^2 + (y_k - y_n)^2 + (z_k - z_n)^2}}\right) = 0 \end{cases}$$

This nonlinear system can be solved using the iterative Newton-Raphson method:

The following notation is used $$F_1(x_k, y_k, z_k) = \begin{cases} f_x^1(x_k, y_k, z_k) = \frac{\partial C_1}{\partial x_k}(x_k, y_k, z_k) \\ f_y^1(x_k, y_k, z_k) = \frac{\partial C_1}{\partial y_k}(x_k, y_k, z_k) \\ f_z^1(x_k, y_k, z_k) = \frac{\partial C_1}{\partial z_k}(x_k, y_k, z_k) \end{cases}$$

In an application to determining the position of the unit 10, the triplet $(x_k, y_k, z_k)$ satisfying $F_1(x_k, y_k, z_k) = (0,0,0)$ is obtained iteratively from an initial value $(x_k, y_k, z_k)_0$ corresponding to the initial values (e.g. (X10init, Y10init, Z10init)), as follows:

$$(X_k)_{p+1} = (X_k)_p - J_{F_1}^{-1}((X_k)_p) F_1((X_k)_p) \text{ and}$$

where:

$(X_k)_p = (x_k, y_k, z_k)_p$, $(X_k)_{p+1} = (x_k, y_k, z_k)_{p+1}$, and $J_{F_1}^{-1}$ is the inverse of the Jacobian matrix associated with $F_1$ and evaluated at the point $(X_k)_p$:

$$J_{F_1} = \frac{\partial(f_x^1, f_y^1, f_z^1)}{\partial(x_k, y_k, z_k)} = \begin{pmatrix} \frac{\partial f_x^1}{\partial x_k} & \frac{\partial f_x^1}{\partial y_k} & \frac{\partial f_x^1}{\partial z_k} \\ \frac{\partial f_y^1}{\partial x_k} & \frac{\partial f_y^1}{\partial y_k} & \frac{\partial f_y^1}{\partial z_k} \\ \frac{\partial f_z^1}{\partial x_k} & \frac{\partial f_z^1}{\partial y_k} & \frac{\partial f_z^1}{\partial z_k} \end{pmatrix}$$

with:

$$\frac{\partial f_x^1}{\partial x_k} = \sum_{n \neq k} w_n \left(1 - d_n \left(\frac{(y_k - y_n)^2 + (z_k - z_n)^2}{((x_k - x_n)^2 + (y_k - y_n)^2 + (z_k - z_n)^2)^{\frac{3}{2}}}\right)\right)$$

$$\frac{\partial f_x^1}{\partial y_k} = \sum_{n \neq k} w_n \left(d_n \left(\frac{(x_k - x_n)(y_k - y_n)}{((x_k - x_n)^2 + (y_k - y_n)^2 + (z_k - z_n)^2)^{\frac{3}{2}}}\right)\right)$$

-continued $$\frac{\partial f_x^1}{\partial z_k} = \sum_{n \neq k} w_n \left( d_n \left( \frac{(x_k - x_n)(z_k - z_n)}{((x_k - x_n)^2 + (y_k - y_n)^2 + (z_k - z_n)^2)^{\frac{3}{2}}} \right) \right)$$

$$\frac{\partial f_y^1}{\partial x_k} = \sum_{n \neq k} w_n \left( d_n \left( \frac{(y_k - y_n)(x_k - x_n)}{((x_k - x_n)^2 + (y_k - y_n)^2 + (z_k - z_n)^2)^{\frac{3}{2}}} \right) \right)$$

$$\frac{\partial f_y^1}{\partial y_k} = \sum_{n \neq k} w_n \left( 1 - d_n \left( \frac{(x_k - x_n)^2 + (z_k - z_n)^2}{((x_k - x_n)^2 + (y_k - y_n)^2 + (z_k - z_n)^2)^{\frac{3}{2}}} \right) \right)$$

$$\frac{\partial f_y^1}{\partial z_k} = \sum_{n \neq k} w_n \left( d_n \left( \frac{(y_k - y_n)(z_k - z_n)}{((x_k - x_n)^2 + (y_k - y_n)^2 + (z_k - z_n)^2)^{\frac{3}{2}}} \right) \right)$$

$$\frac{\partial f_z^1}{\partial x_k} = \sum_{n \neq k} w_n \left( d_n \left( \frac{(z_k - z_n)(x_k - x_n)}{((x_k - x_n)^2 + (y_k - y_n)^2 + (z_k - z_n)^2)^{\frac{3}{2}}} \right) \right)$$

$$\frac{\partial f_z^1}{\partial y_k} = \sum_{n \neq k} w_n \left( d_n \left( \frac{(z_k - z_n)(y_k - y_n)}{((x_k - x_n)^2 + (y_k - y_n)^2 + (z_k - z_n)^2)^{\frac{3}{2}}} \right) \right)$$

$$\frac{\partial f_z^1}{\partial z_k} = \sum_{n \neq k} w_n \left( 1 - d_n \left( \frac{(x_k - x_n)^2 + (y_k - y_n)^2}{((x_k - x_n)^2 + (y_k - y_n)^2 + (z_k - z_n)^2)^{\frac{3}{2}}} \right) \right)$$

When the difference $\Delta = \|(X_k)_{p+1} - (X_k)_p\|$ (the symbol $\|\cdot\|$ designates the Euclidean norm) becomes less than a predetermined value $\epsilon$, then the iterative process is stopped. Simulations show that for a value $\epsilon = 10^{-15}$ convergence is ensured after a number of iterations that is less than fifteen.

By this method, the coordinates, and thus the relative positions, of the units 10, 20, 30, and 40 are calculated by the processor unit 54 of the unit 50 (step 221). The processor unit 54 also calculates the speed of each subordinate unit 10, 20, 30, and 40. This data (positions and speeds) is then input into a predictive Kalman filter 59 of the processor unit 54. The Kalman filter 59 produces an estimate for the position of each subordinate units relative to the unit 50 (step 222). The step 122 consisting in determining the positions of the units 10, 20, 30, and 40 in the terrestrial reference frame by using the GPS coordinates of the unit 50 is then performed. The positions of the units 10, 20, 30, and 40 are then broadcast (step 122) by the unit 58 to the other units.

Minimizing the following cost function $C_2$:

$$C_2(x_k, y_k, z_k) = \sum_{n \neq k} w_n((x_k - x_n)^2 + (y_k - y_n)^2 + (z_k - z_n)^2 - d_n^2)^2$$

that uses the same parameters as $C_1$ also makes it possible to determine the positions of the units 10, 20, 30, and 40 relative to the unit 50.

The search for extrema in this function is performed by applying the same method as for the function $C_1$. Thus, the extremum of the function $C_2$ is obtained by solving the following system of equations:

$$\begin{cases} \frac{\partial C_2}{\partial x_k}(x_k, y_k, z_k) = 0 \\ \frac{\partial C_2}{\partial y_k}(x_k, y_k, z_k) = 0 \\ \frac{\partial C_2}{\partial z_k}(x_k, y_k, z_k) = 0 \end{cases}$$

i.e.:

$$\begin{cases} \frac{\partial C_2}{\partial x_k}(x_k, y_k, z_k) = \\ \sum_{n \neq k} w_n(x_k - x_n)((x_k - x_n)^2 + (y_k - y_n)^2 + (z_k - z_n)^2 - d_n^2) = 0 \\ \frac{\partial C_2}{\partial y_k}(x_k, y_k, z_k) = \\ \sum_{n \neq k} w_n(y_k - y_n)((x_k - x_n)^2 + (y_k - y_n)^2 + (z_k - z_n)^2 - d_n^2) = 0 \\ \frac{\partial C_2}{\partial z_k}(x_k, y_k, z_k) = \\ \sum_{n \neq k} w_n(z_k - z_n)((x_k - x_n)^2 + (y_k - y_n)^2 + (z_k - z_n)^2 - d_n^2) = 0 \end{cases}$$

This nonlinear system can be solved using the iterative Newton-Raphson method:

The following notation is used $$F_2(x_k, y_k, z_k) = \begin{cases} f_x^2(x_k, y_k, z_k) = \frac{\partial C_2}{\partial x_k}(x_k, y_k, z_k) \\ f_y^2(x_k, y_k, z_k) = \frac{\partial C_2}{\partial y_k}(x_k, y_k, z_k) \\ f_z^2(x_k, y_k, z_k) = \frac{\partial C_2}{\partial z_k}(x_k, y_k, z_k) \end{cases}$$

In an application to determining the position of the unit 10, the triplet $(x_k, y_k, z_k)$ satisfying $F_2(x_k, y_k, z_k) = (0,0,0)$ is obtained iteratively from an initial value $(x_k, y_k, z_k)_0$ corresponding to the initial values (e.g. (X10init, Y10init, Z10init)), as follows:

$$(X_k)_{p+1} = (X_k)_p - J_{F_2}^{-1}((X_k)_p) F_1((X_k)_p)$$

where:

$(X_k)_p = (x_k, y_k, z_k)_p$,
$(X_k)_{p+1} = (x_k, y_k, z_k)_{p+1}$, and
$J_{F_2}^{-1}$
is the inverse of the Jacobian matrix associated with $F_2$ and evaluated at the point $(X_k)_p$:

$$J_{F_2} = \frac{\partial(f_x^2, f_y^2, f_z^2)}{\partial(x_k, y_k, z_k)} = \begin{pmatrix} \frac{\partial f_x^2}{\partial x_k} & \frac{\partial f_x^2}{\partial y_k} & \frac{\partial f_x^2}{\partial z_k} \\ \frac{\partial f_y^2}{\partial x_k} & \frac{\partial f_y^2}{\partial y_k} & \frac{\partial f_y^2}{\partial z_k} \\ \frac{\partial f_z^2}{\partial x_k} & \frac{\partial f_z^2}{\partial y_k} & \frac{\partial f_z^2}{\partial z_k} \end{pmatrix}$$

with:

$$\frac{\partial f_x^2}{\partial x_k} = \sum_{n \neq k} w_n(3(x_k - x_n)^2 + (y_k - y_n)^2 + (z_k - z_n)^2 - d_n^2)$$

$$\frac{\partial f_x^2}{\partial y_k} = \sum_{n \neq k} 2w_n(x_k - x_n)(y_k - y_n)$$

$$\frac{\partial f_x^2}{\partial z_k} = \sum_{n \neq k} 2w_n(x_k - x_n)(z_k - z_n)$$

$$\frac{\partial f_y^2}{\partial x_k} = \sum_{n \neq k} 2w_n(y_k - y_n)(x_k - x_n)$$

-continued $$\frac{\partial f_y^2}{\partial y_k} = \sum_{n \neq k} w_n((x_k - x_n)^2 + 3(y_k - y_n)^2 + (z_k - z_n)^2 - d_n^2)$$

$$\frac{\partial f_y^2}{\partial z_k} = \sum_{n \neq k} 2w_n(y_k - y_n)(z_k - z_n)$$

$$\frac{\partial f_z^2}{\partial x_k} = \sum_{n \neq k} 2w_n(z_k - z_n)(x_k - x_n)$$

$$\frac{\partial f_z^2}{\partial y_k} = \sum_{n \neq k} 2w_n(z_k - z_n)(y_k - y_n)$$

$$\frac{\partial f_z^2}{\partial z_k} = \sum_{n \neq k} w_n((x_k - x_n)^2 + (y_k - y_n)^2 + 3(z_k - z_n)^2 - d_n^2)$$

When the difference $\Delta = \|(X_k)_{p+1} - (X_k)_p\|$ (the symbol $\|\cdot\|$ designates the Euclidean norm) becomes less than a predetermined value $\epsilon$, then the iterative process is stopped. Simulations show that for a value $\epsilon = 10^{-15}$ convergence is ensured after a number of iterations that is less than fifteen.

In a particular implementation, the subordinate units 10, 20, 30, and 40 remain in a state of receiving GPS and they transmit their GPS positions to the unit 50 when they can determine them. These positions are accompanied by an indicator representative of the quality of the received GPS signals. In particular, this indicator may correspond to the RSSI measurement of the power of the received GPS signal. The processor unit 54 hybridizes the GPS position measurements, as weighted by a coefficient obtained from the measured RSSI for each position, with the estimates produced by the Kalman filter 59 in order to update the estimated positions of the units in question.

Each of the subordinate stations of the invention thus measures the distances separating it from the others prior to returning the distances as measured in this way to the coordinating station. The coordinating station includes calculation means enabling it to determine the relative positions of the subordinate units on the basis of the distances measured and transmitted by the subordinate units. Thereafter, the coordinating unit broadcasts these positions to the subordinate units.

Naturally, the invention is not limited to the implementations described above but covers any variant coming within the ambit of the invention as defined by the claims.

In particular:
- although in this description, the values used for determining an initial value enable the cost functions $C_1$ or $C_2$ to be minimized by iteration corresponding to the most recent GPS positions stored by each unit, the invention applies likewise to other types of initial value, in particular in the absence of any recent GPS reception by the units. By way of example, these initial values may be selected as being the center of gravity of the other units, optionally weighted by a coefficient obtained from the RSSI values;
- although in this description, the operations of minimizing the cost functions $C_1$ and $C_2$ make use of the iterative Newton-Raphson method, the invention applies equally to performing other types of mathematical methods for solving equations, which may optionally be iterative;
- although in this description, each of the subordinate and coordinating communications units includes a DECT transceiver, the invention applies equally to communications units having other wireless communications means, such as for example means for communication in application of the Wi-Fi, or Bluetooth standards, or using infrared or ultrasound channels;
- although in this description, each of the subordinate and coordinating communications units includes a GPS receiver, the invention applies equally to communications units having other geolocation means, such as for example receivers for the following satellite systems: GLONASS or GALILEO;
- although in this description, each of the communications units is provided with a GPS receiver, the invention applies equally to communications units not having such a receiver;
- although in this description, each of the subordinate and coordinating communications units includes a microcontroller, the invention applies equally to communications units having other data processor means, such as for example a microprocessor;
- although in this description, the identifiers of the communications units are integers, the invention applies equally to other types of identifier, such as for example letter-encoding bytes or pulse trains;
- although in this description, the UWB signatures are constituted by non-periodic pulse trains in the form of eight ultra-short pulses of unit duration equal to 0.5 ns, the invention applies equally to other types of UWB signature, e.g. such as pulse trains comprising different numbers of pulses, or comprising pulses of longer, varying durations, possibly lying in the range 100 picoseconds (ps) to 2.5 ns. UWB signatures remain as series of ultrashort pulses with time spacing that is modulated to encode information. The UWB signatures used do not necessarily include a carrier;
- although in this description, distances as measured by the subordinate units are transmitted to the coordinating unit after transmission delays have elapsed, the invention applies equally to transmitting the measured distances after elapsed durations different from those corresponding to the transmission delays allocated to each of the subordinate units;
- although in this description, the distance measurements between units are taken four times before being transmitted to the coordinating unit, the invention applies equally to some other number of distance measurements before transmission to the coordinating unit, such as for example once only, two or three times, or more than four times;
- although in this description, the positions of the subordinate units are transmitted by the coordinating unit after determining their respective positions in a terrestrial reference frame, the invention applies equally to the coordinating unit transmitting relative positions of the subordinate units before determining their respective positions in a terrestrial reference frame;
- although in this description, the units determine their altitudes by using an altimeter, the invention applies equally to other means for evaluating altitude, such as for example a barometric sensor;
- although in this description, the coordinating unit is outside a building in which the subordinate units move, the invention applies equally to coordinating and subordinate units that are all situated inside a building or out of doors.

The invention claimed is:

1. A method of positioning a group of subordinate communications units relative to a coordinating communications unit, the group comprising at least first, second, third, and fourth subordinate communications units, the coordinating communications unit and the subordinate communications units being movable relative to one another, each communications unit having a UWB transceiver and digital wireless communications means for communicating with the coordinating unit, each subordinate unit including an internal clock synchronized with the clock of the coordinating unit in order to define a shared communications period the method comprising the following steps:

during a preparatory stage, the coordinating unit transmitting to each subordinate unit via the wireless digital communications means a specific identification table comprising an identifier, a UWB signature, and a transmission delay duration, and communicating, via the wireless digital communications means, identification tables for each unit to the other subordinate units; and during an operative stage:
each unit transmitting its UWB signature, this transmission taking place after the transmission delay duration has elapsed as measured from the beginning of the communications period;
each unit analyzing the UWB signatures transmitted by the other units and determining the distances separating that unit from each of the other units;
each subordinate unit transmitting to the coordinating unit the distances between that subordinate unit and each of the other units, this transmission taking place by using the wireless digital communications means; and
the coordinating unit determining the relative positions of the subordinate units.

2. The method according to claim 1, wherein the coordinating unit has geolocation means for determining its position in a terrestrial reference frame, and the method includes an additional step of determining the relative positions of the subordinate units relative to a terrestrial reference frame.

3. The method according to claim 1, including a prior step of determining the relative position of a subordinate unit relative to the coordinating unit, in which step the subordinate unit is positioned at a reference point of known position relative to the coordinating unit.

4. The positioning method according to claim 1, wherein the step of the coordinating unit determining the relative positions of the subordinate units includes a step of optimizing a cost function ($C_1$, $C_2$) corresponding to one of the following expressions:

$$C_1(x_k, y_k, z_k) = \sum_{n \neq k} w_n \left( \sqrt{(x_k - x_n)^2 + (y_k - y_n)^2 + (z_k - z_n)^2} - d_n \right)^2$$

or $$C_2(x_k, y_k, z_k) = \sum_{n \neq k} w_n ((x_k - x_n)^2 + (y_k - y_n)^2 + (z_k - z_n)^2 - d_n^2)^2$$

in which:
$x_k$, $y_k$, and $z_k$ are the coordinates of the unit k of position that is to be determined in the coordinate system associated with the unit 50;
$d_n$ is the distance between the unit k and the unit n;
$x_n$, $y_n$, and $z_n$ are the coordinates of the unit n at the distance $d_n$ from the unit k; and
$w_n$ is a weighting coefficient associated with the measured reception power of the signal coming from the node of index n.

5. The method according to claim 1, including a prior step of determining the position of a subordinate unit relative to the coordinating unit, during which the subordinate unit remains stationary, the coordinating unit moving in a zone containing the subordinate unit, and determining the position of the subordinate unit by triangulation on the basis of UWB transmissions.

6. The method according to claim 1, wherein the internal clocks of the subordinate units are synchronized using the periodic transmission of a synchronizing signal by the coordinating unit.

7. The method according to claim 6, wherein the synchronizing signal is transmitted using the wireless communications means.

8. The method according to claim 7, wherein the coordinating unit is provided with a GPS receiver, and the internal clock of the main unit corresponds to the clock of the GPS receiver.

9. The method according to claim 6, wherein the coordinating unit is provided with a GPS receiver, and the internal clock of the main unit corresponds to the clock of the GPS receiver.

10. The method according to claim 1, wherein the units include means for evaluating altitude, and the method includes an additional step of determining the altitudes of the subordinate units relative to the coordinating unit.

11. A positioning device comprising data processor means and storage means, an internal clock, a UWB transceiver, and wireless digital communications means, the device being characterized in that wherein it is arranged to perform the method according to claim 1.

12. The positioning device according to claim 11, including a GPS receiver.

* * * * *